(12) United States Patent
Campos et al.

(10) Patent No.: US 11,722,219 B2
(45) Date of Patent: Aug. 8, 2023

(54) SYSTEM AND METHODS FOR COHERENT OPTICS BASED DAISY-CHAINING

(71) Applicant: Cable Television Laboratories, Inc., Louisville, CO (US)

(72) Inventors: Luis Alberto Campos, Superior, CO (US); Zhensheng Jia, Superior, CO (US); Jing Wang, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/883,290

(22) Filed: Aug. 8, 2022

(65) Prior Publication Data

US 2022/0385359 A1 Dec. 1, 2022

Related U.S. Application Data

(63) Continuation of application No. 16/760,098, filed as application No. PCT/US2018/059207 on Nov. 5, 2018, now Pat. No. 11,411,649.
(Continued)

(51) Int. Cl.
*H04B 10/2575* (2013.01)
*H04B 10/532* (2013.01)
(Continued)

(52) U.S. Cl.
CPC . *H04B 10/25756* (2013.01); *H04B 10/07953* (2013.01); *H04B 10/25755* (2013.01);
(Continued)

(58) Field of Classification Search
None
See application file for complete search history.

(56) References Cited

U.S. PATENT DOCUMENTS 5,074,631 A * 12/1991 Hamano ............... G02F 1/3136
385/3
2011/0150479 A1 * 6/2011 Kim .................... H04B 10/5561
398/65
(Continued)

FOREIGN PATENT DOCUMENTS

EP 2482481 A1 * 8/2012 .......... H04J 14/0287
GB 2549284 A * 10/2017 ....... H04B 10/07953

*Primary Examiner* — David W Lambert
(74) *Attorney, Agent, or Firm* — Josh C. Snider

(57) ABSTRACT

An optical access network includes an optical hub having at least one processor, and a plurality of optical fiber strands. Each optical fiber strand has a first strand end connected to the optical hub. The network further includes a plurality of nodes connected to at least one segment of a first fiber strand of the plurality of optical fiber strands. Each node is sequentially disposed at respective locations along the first fiber strand at different differences from the optical hub, respectively. The network further includes a plurality of end-points. Each end-point includes a receiver. Each respective receiver (i) has a different optical signal-to-noise ratio (OSNR) from the other receivers, (ii) is operably coupled with at least one node of the plurality of nodes, and (iii) is configured to receive the same optical wavelength signal from the first fiber strand as received by the other receivers.

20 Claims, 14 Drawing Sheets

Related U.S. Application Data

(60) Provisional application No. 62/581,200, filed on Nov. 3, 2017.

(51) Int. Cl.
*H04B 10/61* (2013.01)
*H04J 14/02* (2006.01)
*H04B 10/079* (2013.01)
*H04B 10/564* (2013.01)

(52) U.S. Cl.
CPC ......... *H04B 10/532* (2013.01); *H04B 10/564* (2013.01); *H04B 10/612* (2013.01); *H04B 10/613* (2013.01); *H04J 14/028* (2013.01)

(56) References Cited

U.S. PATENT DOCUMENTS

| | | | |
|---|---|---|---|
| 2011/0211827 A1* | 9/2011 | Soto | H04J 14/0282 398/25 |
| 2014/0363159 A1* | 12/2014 | Chien | H04B 10/548 398/43 |
| 2018/0103303 A1* | 4/2018 | Schell | H04B 10/071 |

* cited by examiner

SYSTEM AND METHODS FOR COHERENT OPTICS BASED DAISY-CHAINING

CROSS REFERENCE TO RELATED APPLICATIONS

This application is a continuation of U.S. patent application Ser. No. 16/760,098 filed Apr. 29, 2020, which is a U.S. National Phase entry of PCT/US2018/059207 filed Nov. 5, 2018, which application claims the benefit of and priority to U.S. Provisional Patent Application Ser. No. 62/581,200, filed Nov. 3, 2017. The disclosures of all of these applications are incorporated herein by reference in their entireties.

BACKGROUND

The field of the disclosure relates generally to fiber communication networks, and more particularly, to optical access networks utilizing sequential nodes along a fiber path.

Telecommunications networks include an access network through which end user subscribers connect to a service provider. Some such networks utilize fiber-optic distribution infrastructures, which have historically provided sufficient availability of fiber strands such that dissimilar types of optical transport signals are carried over their own different fibers. Bandwidth requirements for delivering high-speed data and video services through the access network, however, is rapidly increasing to meet growing consumer demands. As this signal capacity demand continues to grow, the capacity of individual long access fiber strands is limited. The cost of installing new long access fibers is expensive, and dissimilar optical transport signals, unless they are purposely isolated, experience interference from one another on the same fiber strand. This legacy fiber environment requires operators to squeeze more capacity out of the existing fiber infrastructure to avoid costs associated with having to retrench new fiber installment. Conventional coherent optical links provide large amounts of transmission capacity that is typically dedicated to a single end-point. This type of dedicated formation is referred to as a point-to-point (P2P) coherent link.

FIG. 1 is a schematic illustration of a conventional fiber access distribution network 100. Network 100 includes an optical hub 102 configured to optically transmit over a fiber bundle 104 to a plurality of nodes 106. In cable and other access environments, optical distribution networks are typically deployed using a bundle of fibers (e.g., fiber bundle 104) starting from a source location (e.g., hub 102) that follows a common transmission path from where a few fiber strands 108 are dropped or peeled off to a node location (e.g., nodes 106(1)-106(4)) such that dedicated connectivity from source-to-node location is achieved. From a particular dropped location, the remaining unused fibers (dashed lines of fiber strands 108) in bundle 104 may continue following the transmission path to feed subsequent nodes 106 in the fiber path.

In the example depicted in FIG. 1, network 100 is in the cable context, including an optical signal source and signal aggregation location (e.g., hub 102) within cable access distribution network 100. The common path of fiber bundle 104 is depicted as the elliptical path shown. For ease of explanation, fiber bundle 104 of network 100 is depicted as having four fibers strands; however, typical conventional fiber bundles may contain in excess of 100 fiber strands. In the conventional access environment, shorter coherent optical links are considered to provide an ample link margin. However, conventional access networks do not fully leverage this link margin for optical splitting and optical signal sharing among multiple end-points.

BRIEF SUMMARY

In an embodiment, an optical access network includes an optical hub having at least one processor, and a plurality of optical fiber strands. Each optical fiber strand has a first strand end connected to the optical hub. The network further includes a plurality of nodes connected to at least one segment of a first fiber strand of the plurality of optical fiber strands. Each node of the plurality of nodes is sequentially disposed at respective locations along the first fiber strand at different differences from the optical hub, respectively. The network further includes a plurality of end points. Each end point of the plurality of end points includes a receiver. Each respective receiver (i) has a different optical signal-to-noise ratio (OSNR) from the other receivers, (ii) is operably coupled with at least one node of the plurality of nodes, and (iii) is configured to receive the same optical wavelength signal from the first fiber strand as received by the other receivers.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
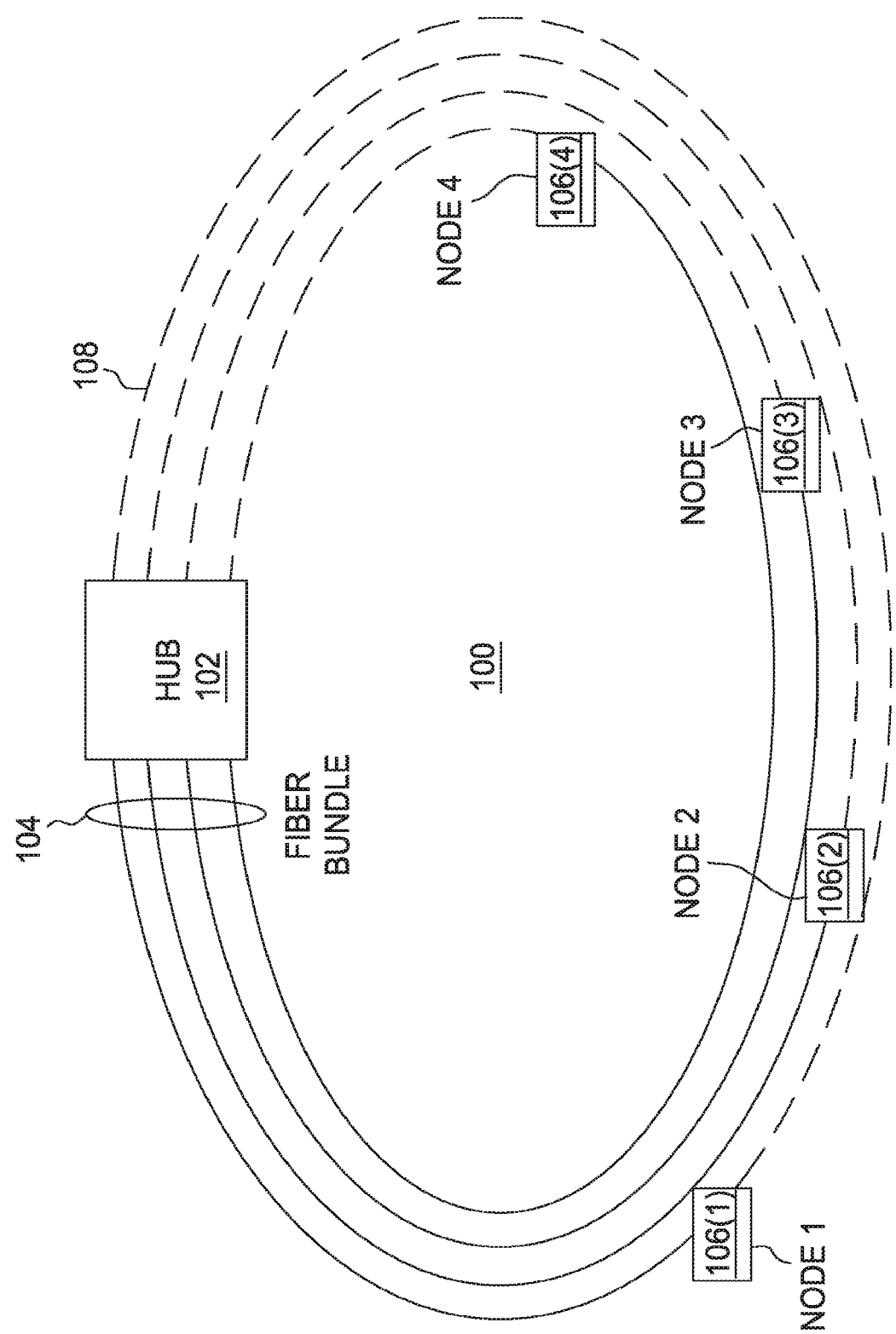
FIG. 1 is a schematic illustration of a conventional fiber access distribution network.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

According to the embodiments herein, systems and methods are provided for efficient sharing of coherent optical signal information among endpoints with different link budgets. The present embodiments are advantageously configured to utilize particular encoding and bit selection within constellations to distribute coherent signals to end-points along an optical daisy-chain/node sequence with different link budgets such that that a suitable optical signal-to-noise-ratio (OSNR) is achieved for the particular end-points.

In some embodiments, training sequences are implemented for bit reception and polarization alignment discrimination between end-points. These training sequences further facilitate the detection of symbols within and across a diversity of constellations. The present systems and methods therefore advantageously leverage the link margin for optical splitting and optical signal sharing among multiple end-points. The embodiments described herein thus significantly improve the ability of an access network to leverage capacity, topology, and link margin characteristics to optimize resource utilization in a shared coherent optics environment.

Optical signals consume different amounts of fiber resources depending on their respective power levels, modulation formats, and wavelength they occupy in relation to wavelengths and characteristics of neighboring signals, symbols and/or bandwidths, among other parameters. The present systems and methods achieve the improvements over the conventional techniques through novel implementation of hardware and/or algorithms to configure transmitted optical signals within the same optical fiber path.

Figure 2:
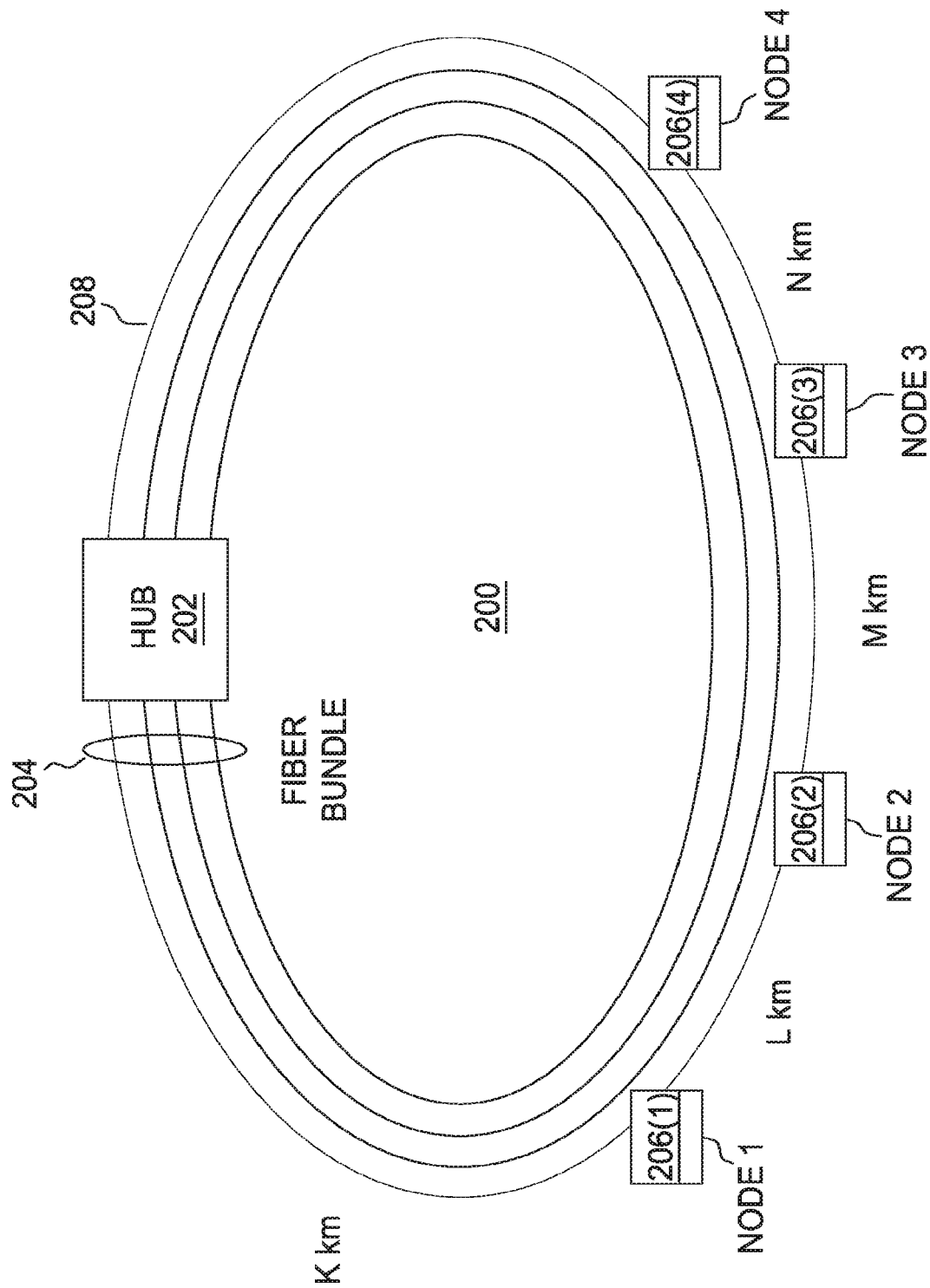
FIG. 2 is a schematic illustration of a fiber access distribution network in accordance with an embodiment of the present disclosure.

FIG. 2 is a schematic illustration of a fiber access distribution network 200. Network 200 has a similar topology to network 100, FIG. 1, and includes an optical hub 202, a fiber bundle 204, and a plurality of nodes 206. Network 200 is different from network 100, in that the plurality of nodes 206 share an optical signal along a single fiber strand 208 in sequence. As used further herein, the term "daisy-chaining" refers to sharing of the same fiber and optical signal wavelength among nodes 206, which are sequentially located along the path of fiber strand 208. Accordingly, in comparison with the example depicted in FIG. 1, the four nodes 106 are distributed among the four separate fiber strands 108, respectively, whereas nodes 206 use and share the same fiber and the same wavelength within a single fiber strand 208.

Figure 3:
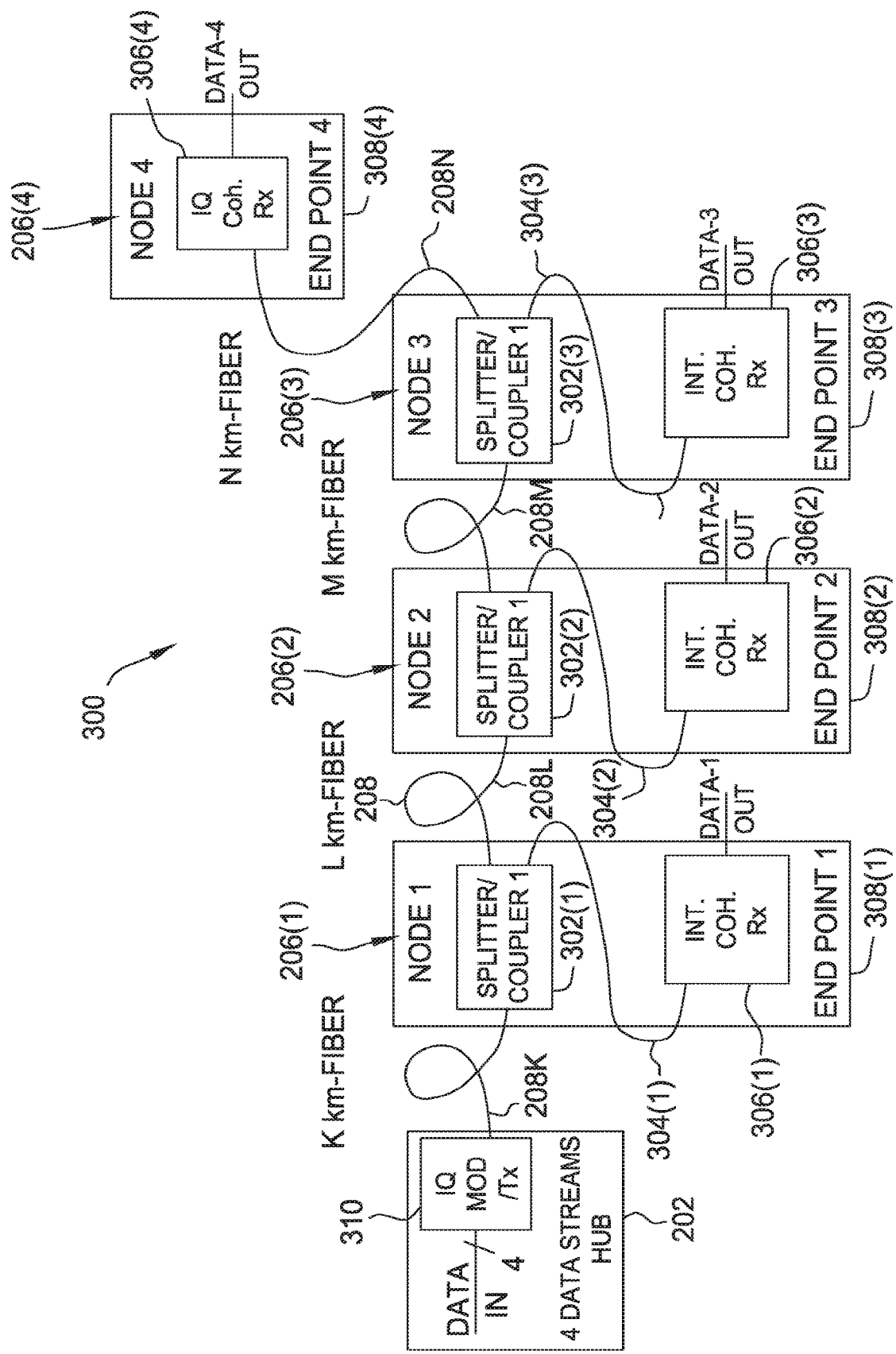
FIG. 3 is a schematic illustration of an optical daisy-chaining link for the network depicted in FIG. 2.

FIG. 3 is a schematic illustration of an optical daisy-chaining link 300 for network 200, FIG. 2. Link 300 includes optical hub 202, nodes 206, and fiber strand 208, and provides additional detail illustrating an interconnection between these several network components. In the example illustrated in FIG. 3, nodes 206 use the same fiber strand 208, which may be cut when passing in proximity to one of nodes 206, and connected with the particular node 206 by a splitter and/or coupler 302. A feed portion 304 from fiber strand 208 couples energy into the respective node 206, where detection and reception of the coherent optical signal occurs, such as by an integrated coherent optical receiver 306 of a respective end-point 308. Fiber strand 208 may then be coupled with each of the respective nodes 206 in a similar manner, in sequence, until fiber strand 208 reaches the final node (e.g., node 206(4), in this example), where optical energy coupling may be avoided, and only coherent reception may be necessary.

In some embodiments, splitter/coupler 302 is a splitter, in the case where the two output fibers (e.g., respective feed portions 304 and continuing fiber strands 208) from splitter/coupler 302 is an even power split. In other embodiments, splitter/coupler 302 is a coupler, in the case where there is an uneven power ratio between the two output fibers. In this case, the coupler (e.g., splitter/coupler 302) may be configured to have a fixed coupling ratio, or may be configured to be tunable. The coupling loss (in dB) of the optical energy dropped at the node is identified as C-Loss (or C/L) and the through loss or insertion loss (in dB) of the optical energy passing to the next node is identified as I-Loss (or I/L). The link loss LL (in dB) at each end-point 308 may then be determined, with respect to attenuation Att (in dB) of portions K-L of fiber strand portions 208, as follows:

$$LL(1) = Att(K) + C/L(1) \tag{Eq. 1}$$

$$LL(2) = Att(K) + I/L(1) + Att(L) + C/L(2) \tag{Eq. 2}$$

$$LL(3) = Att(K) + I/L(1) + Att(L) + I/L(2) + Att(M) + C/L(3) \tag{Eq. 3}$$

$$LL(4) = Att(K) + I/L(1) + Att(L) + I/L(2) + Att(M) + I/L(3) + Att(N) \tag{Eq. 4}$$

These coupling ratios at each node 206, as well as the power loss due to fiber attenuation between nodes, may then be used to determine the different power levels of the receivers (not shown in FIG. 3) at the node locations. Using the link loss calculations described above, and assuming a transmit power level Tx (in dBm, or another logarithmic unit of power) from an optical transmitter 310, the respective receiver power levels Rx (in dBm) at the several nodes 206 may be calculated as:

$$Rx(1)=Tx-LL(1) \quad \text{(Eq. 5)}$$

$$Rx(2)=Tx-LL(2) \quad \text{(Eq. 6)}$$

$$Rx(3)=Tx-LL(3) \quad \text{(Eq. 7)}$$

$$Rx(4)=Tx-LL(4) \quad \text{(Eq. 8)}$$

In actual practice, the respective receiver power levels Rx and nodes 206 will likely be different from one another. That is, the four illustrated independent signal streams are targeted to be received by four different respective receivers that require different OSNR values. However, according to the techniques described further below, values of couplers 302 may be set such that the coupler values match the required OSNR levels, obtained by selecting particular bits within a corresponding constellation.

Figure 4:
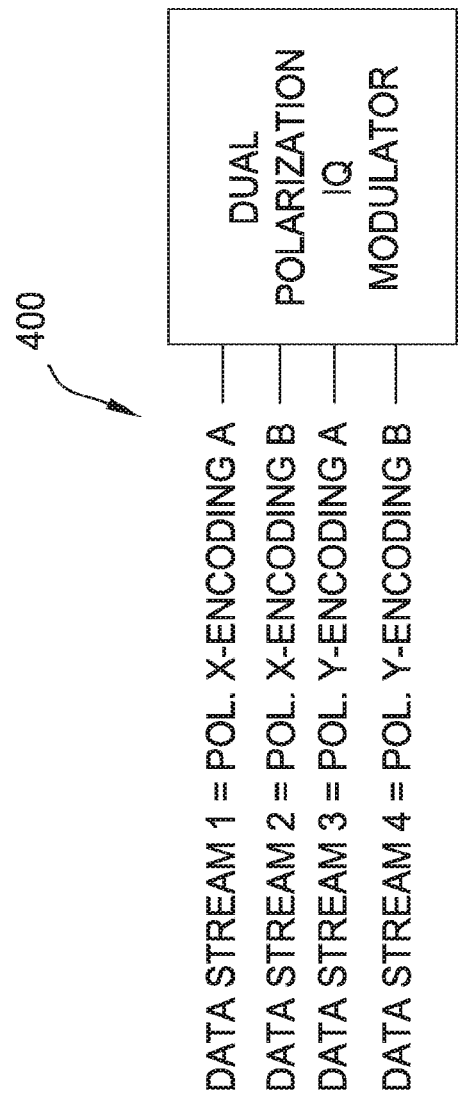
FIG. 4 is a schematic illustration of an exemplary optical transmitter in accordance with an embodiment of the present disclosure.

FIG. 4 is a schematic illustration of an exemplary optical transmitter 400. In an exemplary embodiment, optical transmitter 400 may be implemented similarly to optical transmitter 310, FIG. 3, and is a dual-polarization I/Q modulator configured for four independent data streams: (i) an X-polarization according to a first encoding scheme A; (ii) an X-polarization according to a second encoding scheme B; (iii) a Y-polarization according to the first encoding scheme A; and (iv) a Y-polarization according to the second encoding scheme B.

Figure 5:
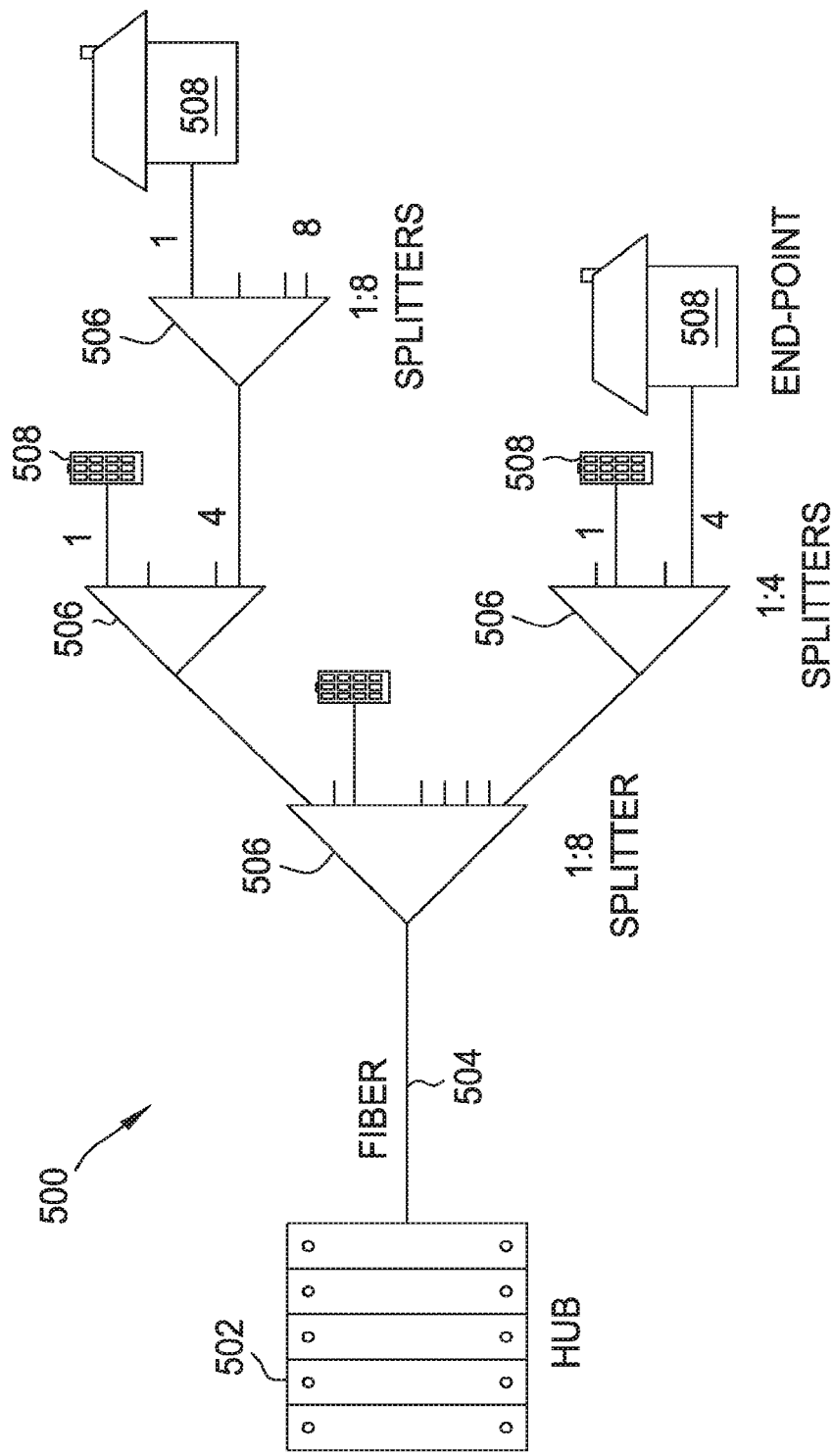
FIG. 5 is a schematic illustration of an exemplary optical network in accordance with an embodiment of the present disclosure.

FIG. 5 is a schematic illustration of an exemplary optical network 500. In the exemplary embodiment depicted in FIG. 5, network 500 is a passive optical network (PON) having an optical hub 502, a fiber strand 504, and a plurality of cascading splitters 506 for splitting an optical signal carried over fiber strand 504 to a plurality of end-points 508. This example, the techniques described above may be adapted to optimizing capacity and performance of PON network 500, where network 500 employs a sequence of cascading splitters 506 that result in a different loss experienced at the different end-points 508.

Figure 6:
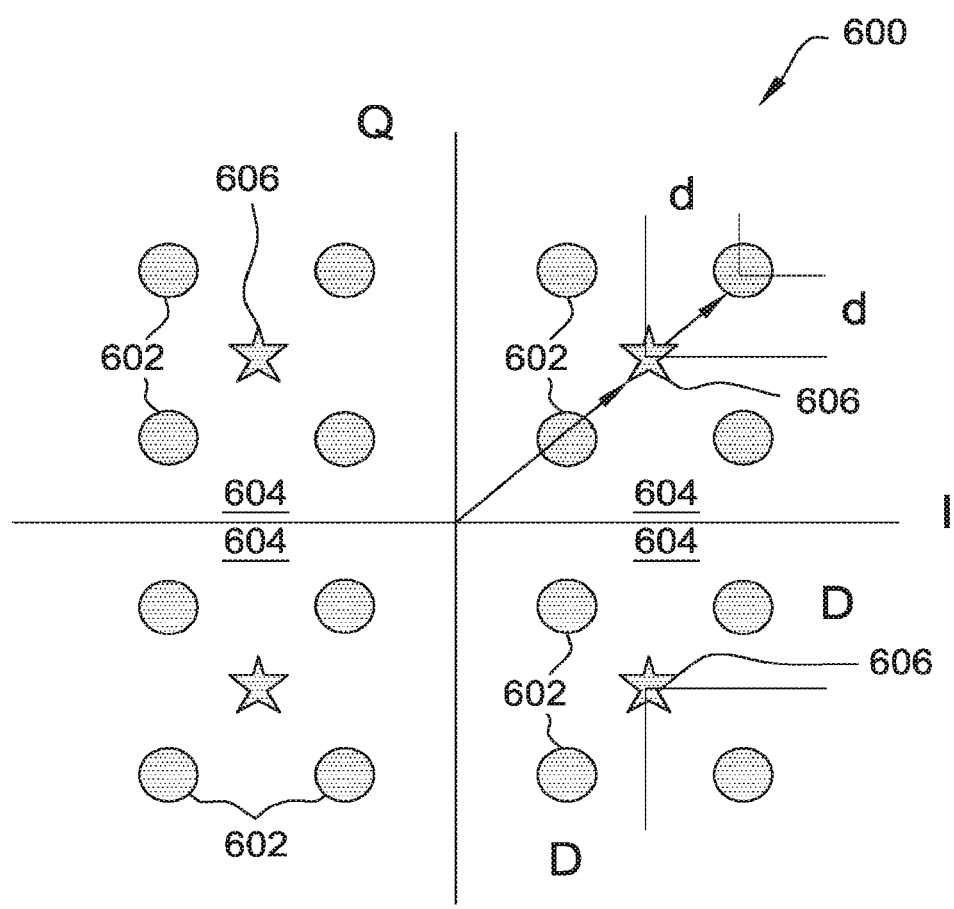
FIG. 6 illustrates a constellation plot for a signal transmitted by the transmitter depicted in FIG. 4.

FIG. 6 illustrates a constellation plot 600 for a signal transmitted by transmitter 400, FIG. 4. In the exemplary embodiment illustrated in FIG. 6, constellation plot 600 represents an intra-symbol embodiment of a constellation for a single polarization (e.g., X or Y, A or B). In this example, plot 600 is depicted for a 16 QAM constellation of one of the polarizations generated by an IQ modulator (described further below), having D and d parameters describing locations of respective symbols 602. A standard 16 QAM constellation is illustrated in FIG. 6 by way of example, and not in a limiting sense. The principles of the several embodiments described herein may apply to other constellations. Constellation plot 600 is illustrated with respect to four quadrants 604, which each have a respective center 606.

According to constellation plot 600, each symbol 602 may be represented within each quadrant 604 according to their particular/ IQ coordinates (±D, ±d), as shown below with respect to Table 1.

TABLE 1

|  | I | Q |
|---|---|---|
| 1$^{st}$ Quadrant | +D−d | +D−d |
|  | +D+d | +D−d |
|  | +D+d | +D+d |
|  | +D−d | +D+d |

TABLE 1-continued

|  | I | Q |
|---|---|---|
| 2$^{nd}$ Quadrant | −D−d | +D−d |
|  | −D+d | +D−d |
|  | −D+d | +D+d |
|  | −D−d | +D+d |
| 3$^{rd}$ Quadrant | −D−d | −D−d |
|  | −D+d | −D−d |
|  | −D+d | −D+d |
|  | −D−d | −D+d |
| 4$^{th}$ Quadrant | +D−d | −D−d |
|  | +D+d | −D−d |
|  | +D+d | −D+d |
|  | +D−d | −D+d |

Figure 7:
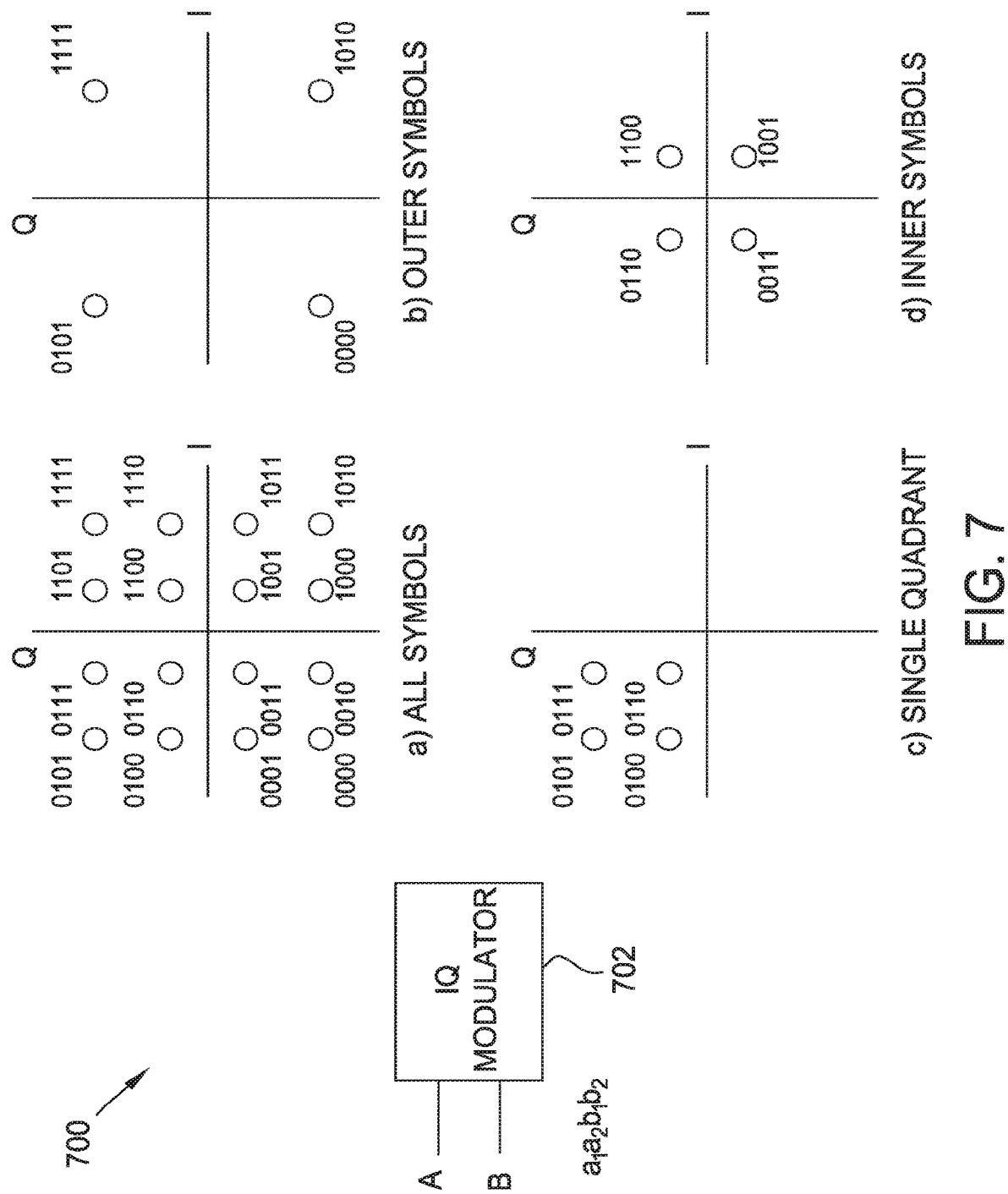
FIG. 7 illustrates an exemplary bit-to-symbol mapping for the constellation depicted in FIG. 6.

FIG. 7 illustrates an exemplary bit-to-symbol mapping 700 for constellation 600, FIG. 6 (i.e., a 16 QAM constellation). In an exemplary embodiment, mapping 700 represents a symbol mapping corresponding to the two concatenated streams for a single polarization. That is, the other polarization may utilize the same bit-to-symbol mapping technique used for the first polarization.

In the exemplary embodiment depicted in FIG. 7, the four bits representing 16 QAM constellation 600 are encoded by an I/Q modulator 702 such that the first two bits of the four bits represent a greater variation in amplitude between symbols, whereas the second two bits represent a potentially smaller amplitude variation. The first two bits are therefore considered the two most significant bits (MSBs) and the last two bits are considered the two least significant bits (LSBs).

In addition to the encoding of bits to all symbols (e.g., FIG. 7(a)), specific sequences of symbols may be used as a reference in a portion of the transmission to facilitate decoding of the I and Q coordinates of the symbols. These symbol sequences thus form subsets (e.g., FIGS. 7(b), 7(c), 7(d)) of all symbols (e.g., FIG. 7(a)) if, which may then be used to determine coordinates [±D,±d] for a specific 16 QAM transmission.

As illustrated in FIG. 7(b), the transmission of outer constellation symbols enables the determination of an estimate of the maximum amplitude $A_{max}$, which is proportional to D+d. As illustrated in FIG. 7(d), the transmission of the inner symbols enables an estimate of the minimum amplitude $A_{min}$, which is proportional to D−d. These estimates result in two equations and two unknowns that can be solved for D and d as follows:

$$D+d=A_{max} \quad \text{(Eq. 9)}$$

$$D-d=A_{min} \quad \text{(Eq. 10)}$$

$$D=(A_{max}+A_{min})/2 \quad \text{(Eq. 11)}$$

$$d=(A_{max}-A_{min})/2 \quad \text{(Eq. 12)}$$

In addition to these constellation subsets, a subset using all symbols within one quadrant may be used to provide test vectors to enable an end-point requiring higher OSNR to better distinguish the information conveyed as illustrated in FIG. 7(c).

In an alternative embodiment, in the case where only one data stream is transmitted, OSNR may be enhanced by copying the same bits of the active bit stream onto the silent bit stream. An example of a constellation having one data stream silent is illustrated in FIG. 7(b). In this example, the transmission mode may be accompanied by a code indicating that one stream is silent and an effective QPSK transmission is taking place. This transmission mode may also be used for transmitting the same information to both endpoints, such as administration or management information and to help facilitate polarization alignment and polarization discrimination when transmitting one polarization at a time.

Figure 8:
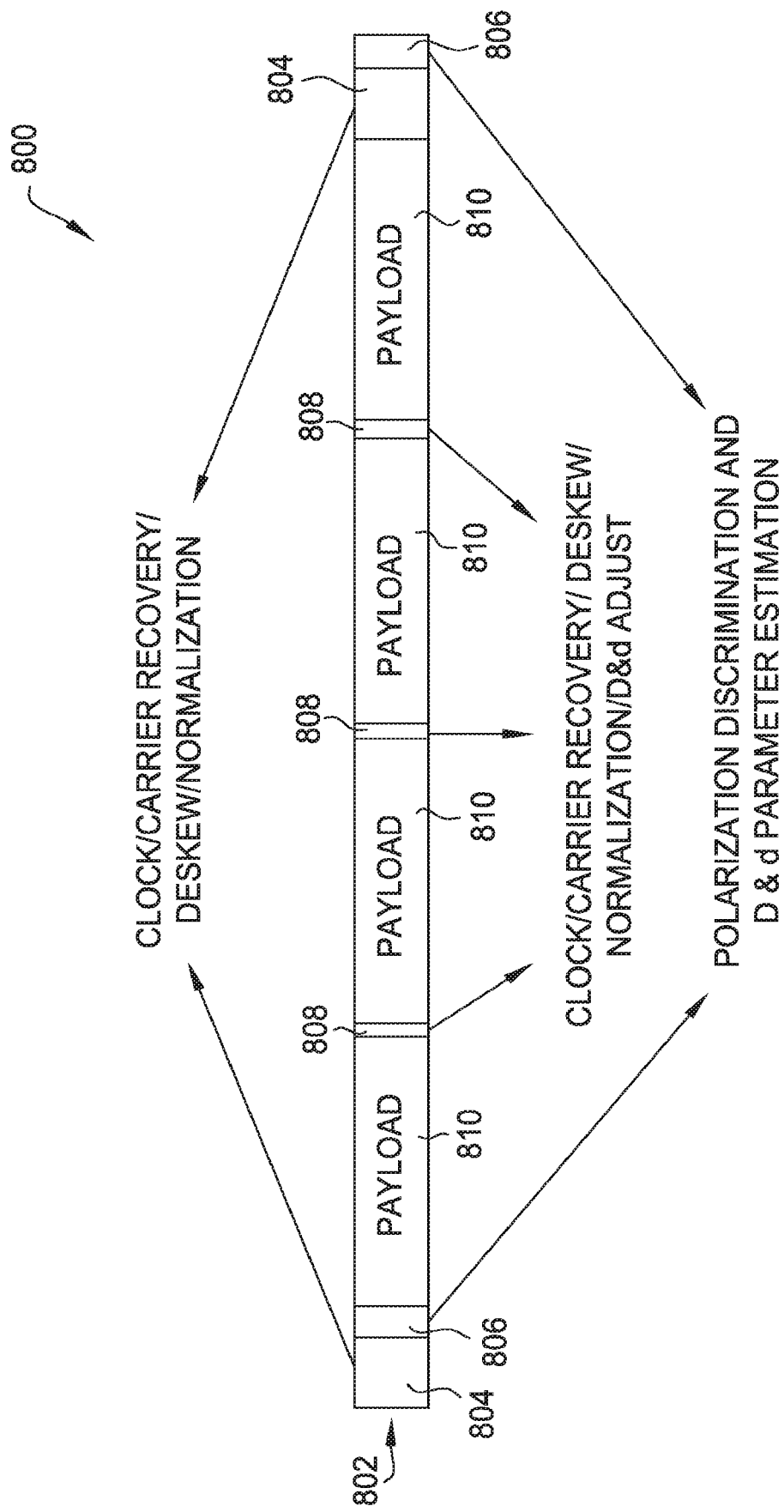
FIG. 8 illustrates an exemplary architecture for a repeating downstream transmission segment in accordance with an embodiment of the present disclosure.

FIG. 8 illustrates an exemplary signal architecture 800 for a repeating downstream transmission segment 802. In an exemplary embodiment, architecture 800 utilizes segment 802 to enhance detection and polarization discrimination capabilities at the receiver, and in the time domain and over multiple symbols. Signal architecture 800 includes, for example, administration periods 804, alignment sections 806, calibration sections 808, and payload portions 810.

As illustrated in the exemplary embodiments depicted in FIG. 8, the data stream of segment 802 demonstrates a relatively longer duration for administration period 804 and for calibration sections 808, which may include a training sequence to facilitate clock and carrier recovery, deskewing, and I/Q normalization. In this example, administration period 804 is also relatively longer than the duration for alignment sections 806, which may be utilized for polarization discrimination, alignment, and [D,d] parameter estimation. In an embodiment, the relatively shorter calibration sections 808 enable adjustment and/or calibration of receiver parameters, and may be included before subsequent cyclical iterations of the longer administration periods 804, which may provide clock recovery and compensation. In some cases, a substantial portion of the corresponding processing may be achieved using information provided in payload portions 810. However, in systems that could potentially be turned on and off rather frequently, having a sequence to accelerate the receive signal detection and manipulation processes is advantageous.

Figure 9:
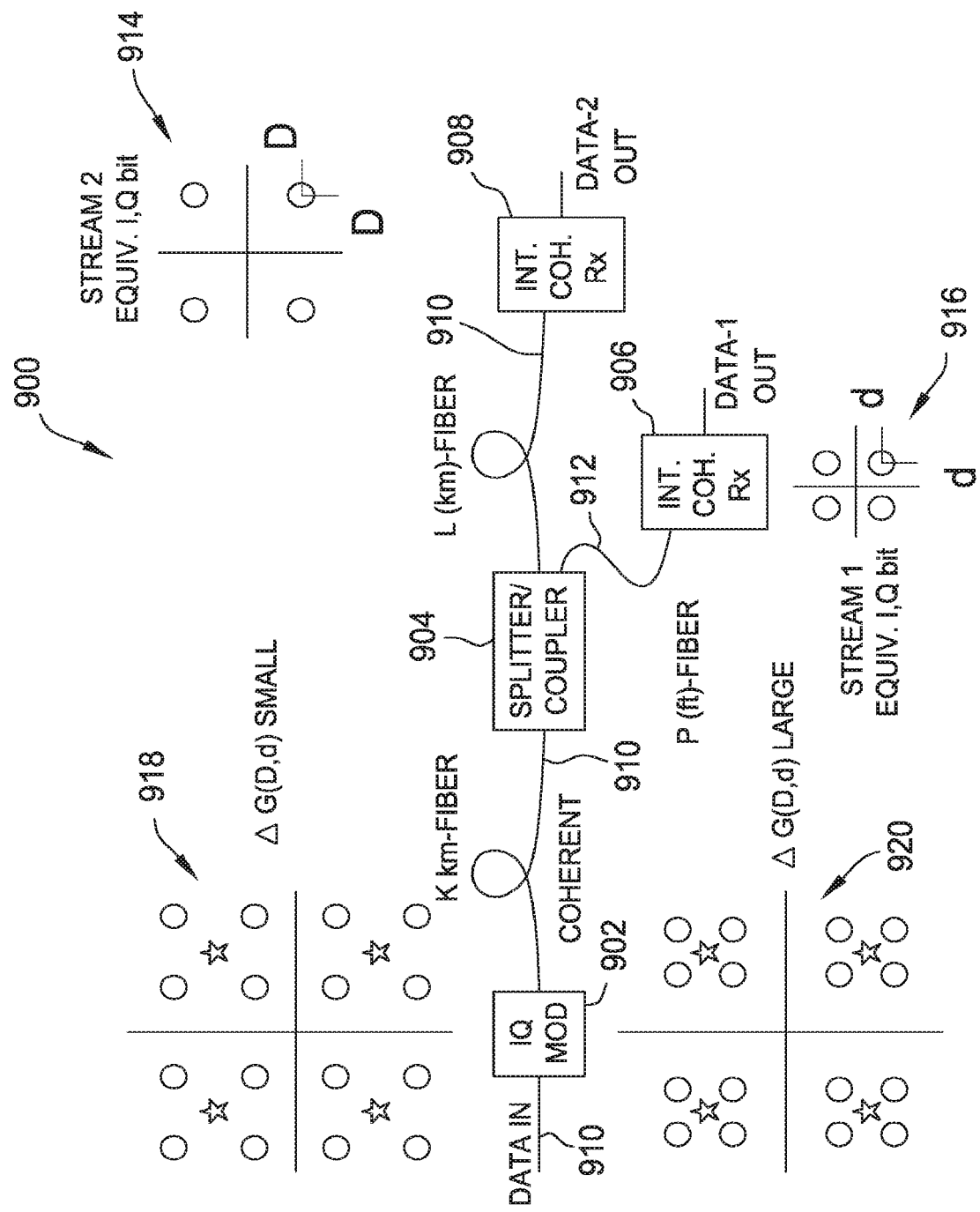
FIG. 9 is a schematic illustration of an exemplary daisy-chain system for the mapping depicted in FIG. 7.

FIG. 9 is a schematic illustration of an exemplary daisy-chain system 900 for mapping 700, FIG. 7. In the example depicted in FIG. 9, daisy-chain system 900 is illustrated for a two-node single polarization 16 QAM modulation. System 900 includes, for example, an I/Q modulator 902, a splitter/coupler 904, a first receiver 906, and a second receiver 908. System 900 transmits an optical signal over a fiber strand 910 that communicatively couples the various system components. Splitter/coupler 904 may be similar in structure and function to splitter/coupler 302, FIG. 3, first and second receivers 906, 908 may be similar to receivers 306, FIG. 3, and modulator 902 may be similar to modulator 702, FIG. 7.

In the exemplary embodiment, fiber strand 910 includes a segment K between modulator 902 and splitter/coupler 904, and a segment L between splitter/coupler 904 and second receiver 908. In this example, a feed portion 912 couples splitter/coupler 904 to first receiver 906. Segments K and L of fiber strand 910 may represent several kilometers of optical fiber length, whereas feed portion 912 may represent several feet of optical fiber length.

In an exemplary embodiment, it is presumed that D=2d, representing a case of a standard 16 QAM constellation having evenly distributed constellation points. In this example, the SNR required for a data stream 914 carrying the two MSBs will be considered more robust than a data stream 916 carrying the LSBs. In this example, correct decoding of the two MSBs need not require a correct interpretation of the LSBs. Therefore, the two MSBs may be used for the end-point having the highest loss, or which may be receiving the weakest signal. An exemplary constellation 918, where D=2d, is thus depicted to illustrate a case where the variation in gain between one end-point and another is considered small (i.e., ΔG(D,d)small).

In an alternative embodiment, an exemplary constellation 920 is depicted to illustrate the case where D>2d. That is, constellation 920 represents a variation of the 16 QAM constellation, where the constellation points within an individual quadrant get closer together in proximity as D becomes greater than 2d. According to the present embodiments, the difference in the required SNR between the respective data streams may be increased and adjusted to address this case where the variation in gain between one end-point and another is considered large (i.e., ΔG(D,d) large).

Accordingly, the SNR required for data stream 914 is lower than the SNR required for data stream 916. The corresponding link budgets for both data streams 914, 916 may then be obtained from the D and d values. In an exemplary embodiment, a portion of the training signal (e.g., FIG. 8) may be configured to repeat periodically and facilitate discrimination between polarizations and the estimation of the D and d parameters.

The examples described above feature a dual-polarization 16 QAM signal to demonstrate signal sharing by four different levels of end-points link budgets. Nevertheless, the person of ordinary skill in the art will appreciate that the principles and techniques described herein are applicable to significantly more elaborate constellations as well, which are capable of sharing signals among a significantly greater number of end-points. For example, a dual-polarization 64 QAM signal might be shared among six individual data streams, and each such data stream may have a QPSK-equivalent modulation with different respective SNR requirements. The present embodiments thus represent advantageously agile approach for implementing power division multiplexing of data streams within a symbol.

Figure 10:
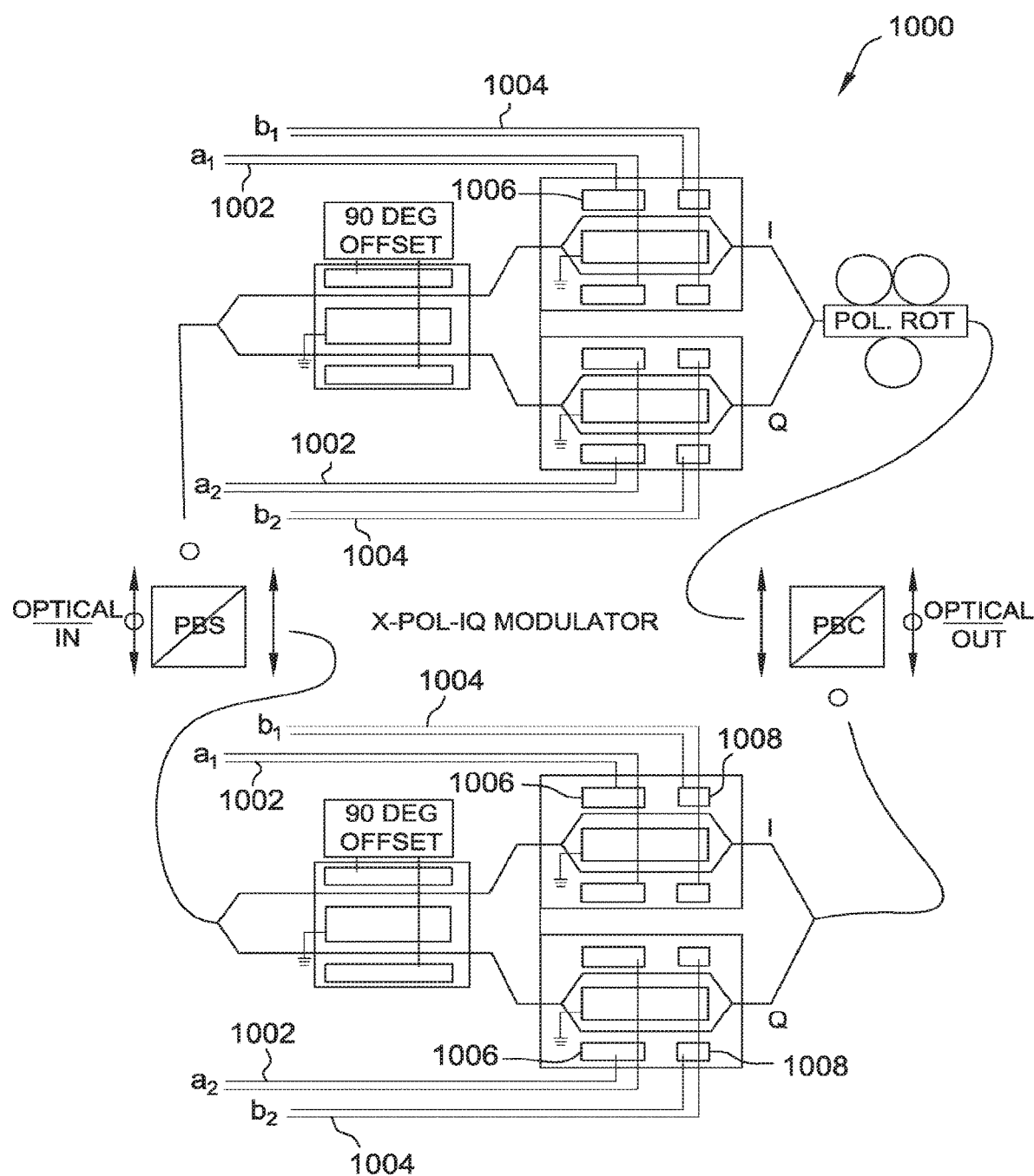
FIG. 10 is a schematic illustration of an exemplary modulator in accordance with an embodiment of the present disclosure.

FIG. 10 is a schematic illustration of an exemplary modulator 1000. In an exemplary embodiment, modulator 1000 is a dual-polarization, dual-parallel Mach-Zehnder modulator (MZM) with split asymmetric electrodes. Modulator 1000 is functional to facilitate carrying of a first data stream 1002 (e.g., $a_1$, $a_2$) and a second data stream 1004 (e.g., $b_1$, $b_2$). In the exemplary embodiment, first and second data streams 1002, 1004 are driven with the same voltage amplitudes. However, in order to achieve a larger optical intensity swing using first data stream 1002, the length of a first electrode 1006 corresponding to first data stream 1002 is longer than a second electrode 1008 corresponding to second data stream 1004, such that a greater section of an optical waveguide of modulator 1000 is influenced by the voltage applied by first data stream 1002. Second data stream 1004 will therefore require a lower optical intensity swing, and therefore the relatively shorter electrode length is provided to achieve the smaller optical intensity variation using the same voltage amplitude as first data stream 1002.

Figure 11:
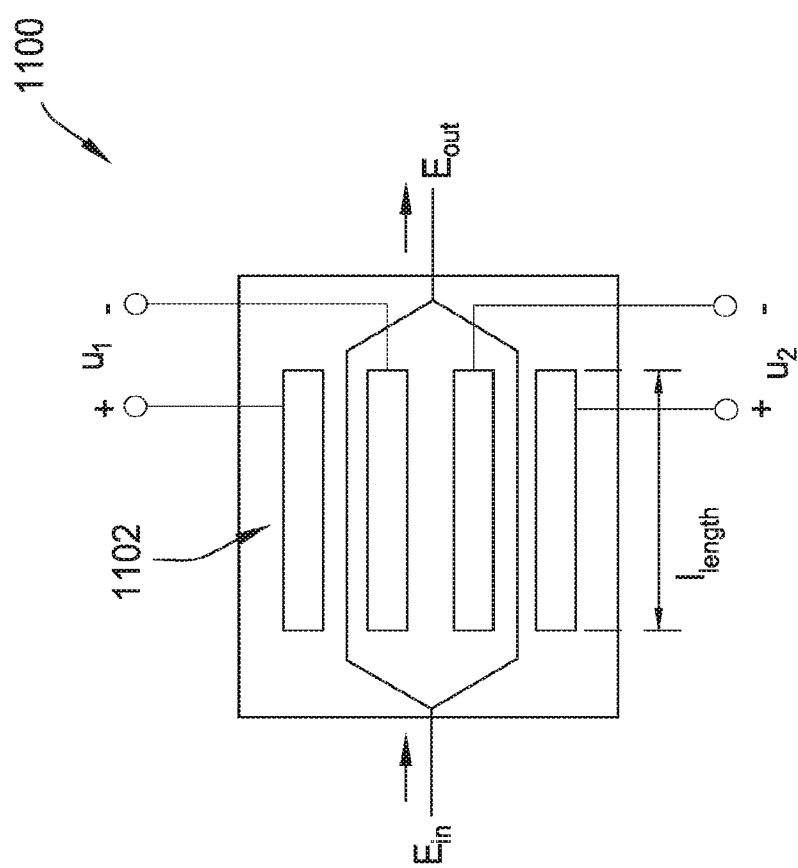
FIG. 11 is a schematic illustration of a conventional Mach-Zehnder modulator.

FIG. 11 is a schematic illustration of a conventional MZM modulator 1100. The electric field transfer function equation governing the behavior of MZM 1100, for example, is represented by:

$$\frac{E_{out}(t)}{E_{in}(t)} = \frac{1}{2}\left(e^{i\varphi_1(t)} + e^{i\varphi_2(t)}\right) \quad \text{(Eq. 13)}$$

where $\varphi_1(t)$ and $\varphi_2(t)$ represent the phase shifts generated under each of MZM electrodes 1102, as described below with respect to equations Eq. 14 and Eq. 15, which also relate the phase shift generated when voltages $u_1(t)$ and $u_2(t)$ are applied to each of the respective electrodes 1102:

$$\varphi_1(t) = \frac{2\pi}{\lambda}\Delta n_{eff1}(t) * l_{length1} = \frac{u_1(t)}{V_\pi}\pi \quad \text{(Eq. 14)}$$

-continued $$\varphi_2(t) = \frac{2\pi}{\lambda}\Delta n_{\mathit{eff}2}(t) * I_{length2} = \frac{u_2(t)}{V_\pi}\pi \quad \text{(Eq. 15)}$$

where $\Delta n_{\mathit{eff}}(t)$ is the variation of the index of refraction in time, $I_{length}$ is the electrode length or interactive length, $u_1(t)$ and $u_2(t)$ are the voltages applied respectively to each of the arms (electrodes) of MZM modulator 1100, and $V_\pi$, is the characteristic voltage needed to generate a π phase shift. The longer are electrodes 1102, the greater the phase shift that is generated. That is, an electrode having twice a given length will generate twice the phase shift as an electrode having the given length.

Eq. 14 and Eq. 15 thus further demonstrate how a larger voltage will generate a proportionally larger phase shift. The present embodiments are therefore advantageously capable of leveraging such relationships by providing split electrodes with one electrode (e.g., first electrode 1006, FIG. 10) larger than another electrode (e.g., second electrode 1008, FIG. 10) such that the same voltage may be used to drive the two intended data streams (e.g., first and second data streams 1002, 1004, FIG. 10) to generate each constellation.

In an alternative embodiment to modulator 1000, FIG. 10, equal size/length electrodes may be implemented, but using greater drive voltages for the respective data streams 1002, 1004 (i.e., a greater drive voltage for first data stream 1002). In this alternative embodiment, a conventional MZM (e.g., modulator 1100, FIG. 11) may be used, as well as generally low-complexity processing to generate the multi-level signal that drives this alternative modulator configuration.

Figure 12:
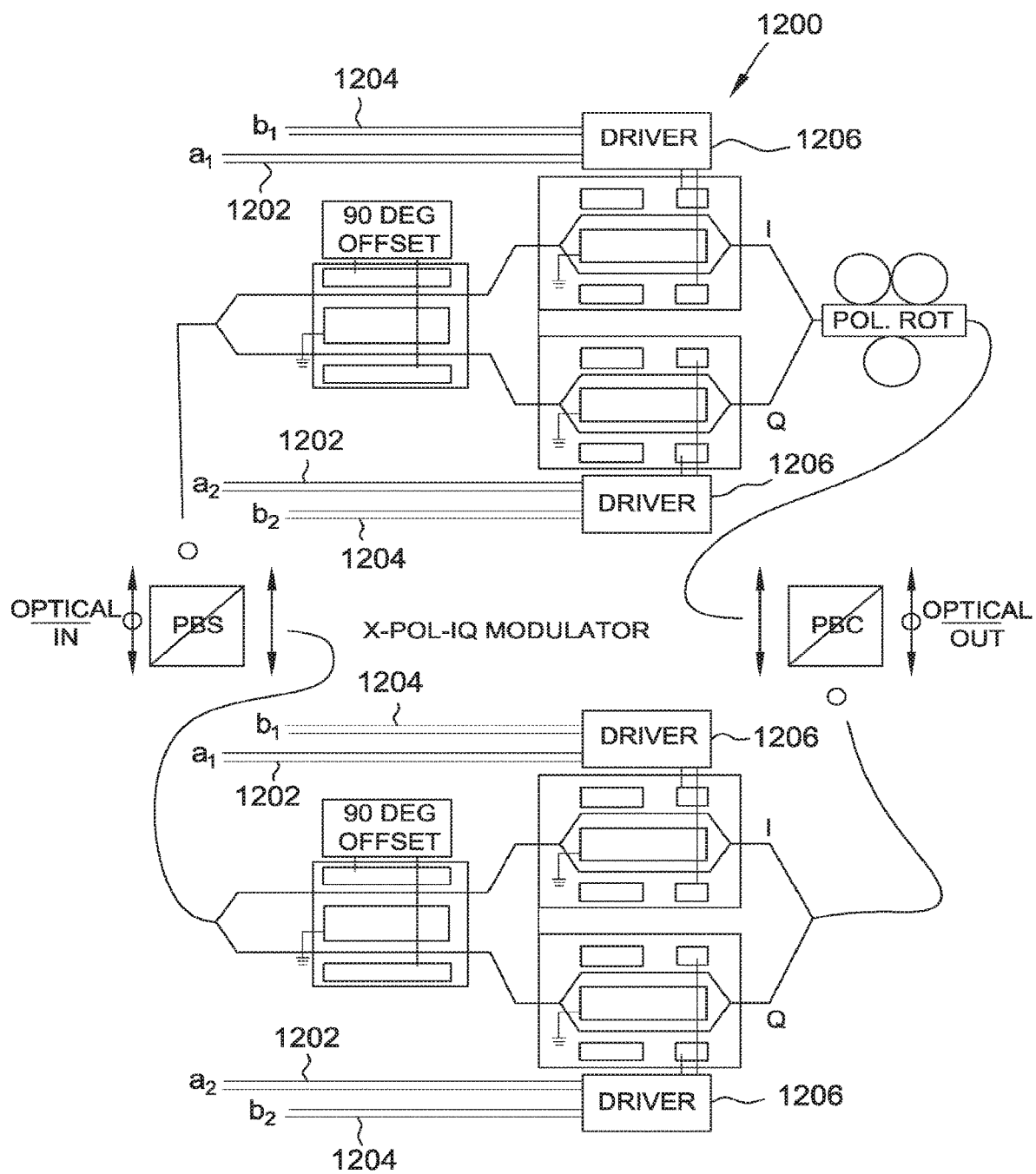
FIG. 12 is a schematic illustration of an exemplary modulator in accordance with an embodiment of the present disclosure.

FIG. 12 is a schematic illustration of an exemplary modulator 1200. In an exemplary embodiment, modulator 1200 is similar to modulator 1000, FIG. 10, and represents a dual-polarization, dual-parallel MZM for a first data stream 1202 and a second stream 1204. Different though, from modulator 1000, modulator 1200 implements a driver 1206 to provide uneven voltages to drive first data stream 1202 as and second stream 1204, respectively. In an exemplary embodiment, in the case of a 16 QAM implementation, driver 1206 may be a four-bit digital-to-analog (D/A) converter, as described further below with respect to FIG. 13.

Figure 13:
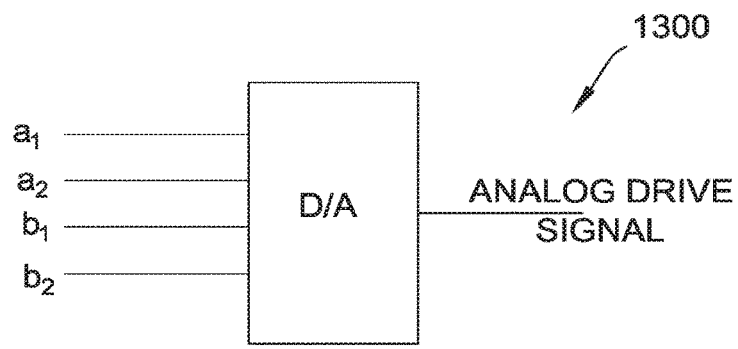
FIG. 13 is a schematic illustration of an exemplary digital-to-analog converter driver in accordance with an embodiment of the present disclosure.

FIG. 13 is a schematic illustration of an exemplary D/A converter driver 1300. In the example illustrated in FIG. 13, driver 1300 implements four-bit D/A conversion, and may be utilized with one or more of the modulator embodiments described above. In some embodiments, where the modulator is an MZM, driver 1300 may be implemented with an equalizer (not shown), since MZMs are typically nonlinear devices, and an equalizer may provide useful correction capabilities for nonlinearities or arising from the MZM.

In an exemplary embodiment, the modulators and drivers described above are useful to calculate the energy of symbols within a quadrant as a function of D and d, to quantify the differences in receive sensitivity between data streams. The symbol energy in the respective quadrants may be calculated according to:

(D+d)2+(D+d)2=2D2+4Dd+2d2 (Eq. 16)

(D+d)2+(D−d)2=2D2+2d2 (Eq. 17)

(D−d)2+(D+d)2=2D2+2d2 (Eq. 18)

(D−d)2+(D−d)2=2D2−4Dd+2d2 (Eq. 19)

Accordingly, the aggregate symbol energy from all symbols (i.e., all for quadrants)=32D2+32d2, the average symbol energy is =2D2+2d2, and the peak symbol energy is =2D2+4Dd+2d2.

It is noted here that the average symbol energy of this 16 QAM constellation example (2D2+2d2) provides a useful metric for an end-point having a relatively weaker receive signal. An end-point receiving a stronger signal though, should be able to distinguish a signal that has a more granular potential variability located within one quadrant. That is the endpoint receiving a stronger signal should distinguish an effective signal energy=d2.

The embodiments described above thus demonstrate how to utilize information within a symbol. In some cases though, in order to utilize different receive data streams with different average SNRs, independent control of each of the symbols may provide greater flexibility to generate different SNR conditions. As described further below, an effective OSNR may be obtained through OSNR averaging from the composition of the different modulation orders in a sequence of symbols that are targeted to a specific end-point. A comparison of bit error rate (BER) against carrier-to-noise ratio (CNR) for different modulation orders is described further below with respect to FIG. 14.

Figure 14:
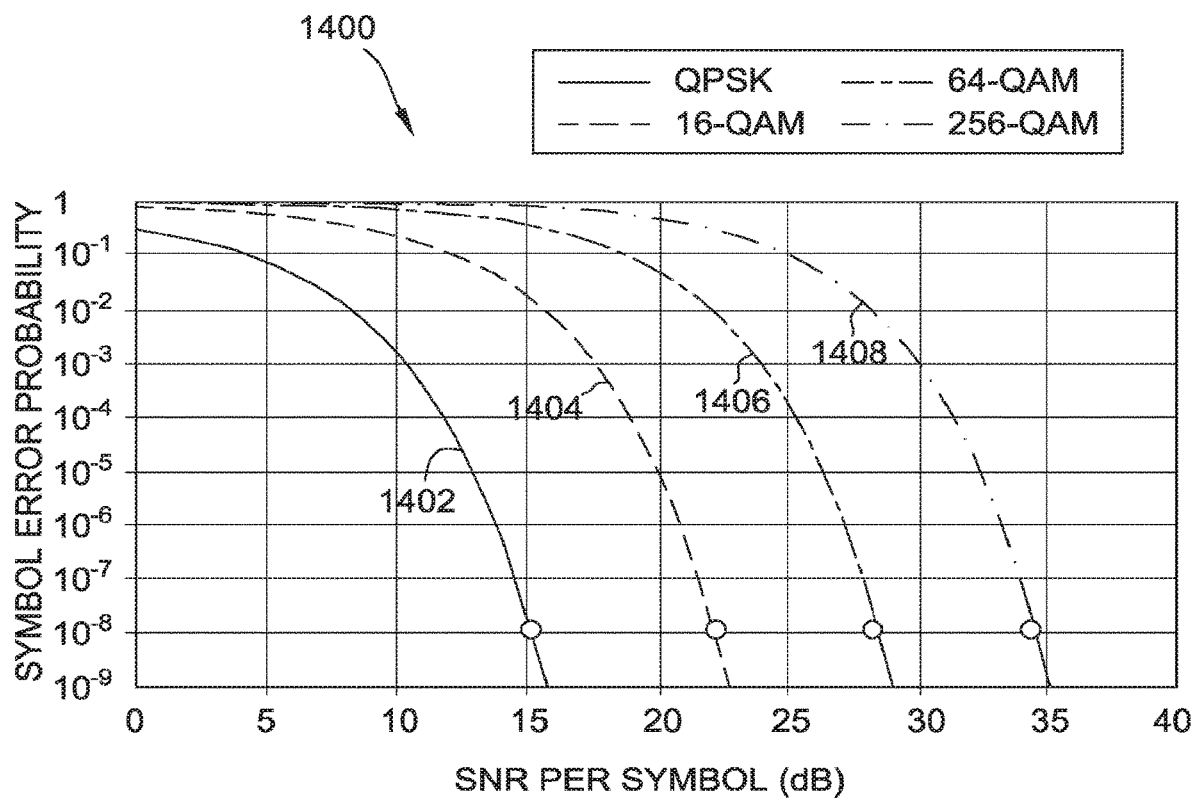
FIG. 14 is a graphical illustration of a plot depicting a symbol error probability versus signal-to-noise-ratio in accordance with an embodiment of the present disclosure.

FIG. 14 is a graphical illustration of a plot 1400 depicting a symbol error probability (vertical axis) versus signal-to-noise-ratio (SNR, horizontal axis). Plot 1400 illustrates the comparative relationship of a first curve 1402 for a QPSK modulation order, a second curve 1404 for a 16 QAM modulation order, a third curve 1406 for a 64 QAM modulation order, and a fourth curve 1408 for a 256 QAM modulation order. Curves 1402, 1404, 1406, 1408 may further vary according to the impact of potential added forward error correction (FEC) codings, but the relative differences in performance among the different modulations would nevertheless be similar (but merely value-shifted). In the exemplary embodiment depicted in FIG. 14, the BER is 10-8, and the SNR for is 15 dB for QPSK curve 1402, 22 dB for 16 QAM curve 1404, and 28 dB for 64 QAM curve 1406.

Accordingly, in this embodiment by taking advantage of the averaging capabilities of SNR for groups of symbols, the effective SNR may be advantageously configured to match the channel requirements for each of the different end-points. For example, if there are four end-points (EP1, EP2, EP3, EP4) that are daisy-chained, and the SNR requirements for EP1, EP2, EP3 and EP4 are respectively 22 dB, 20 dB, 17 dB, and 15 dB, then for EP2, the system may dedicate a substantial portion of the symbols using 16 QAM, and relatively fewer symbols using QPSK, such that the effective SNR would be 20 dB. Similarly, EP3 may require an SNR of approximately 18 dB, and a similar type of combination of QPSK and 16 QAM symbols may be aggregated to generate the desired SNR for EP3. However, in this case, since EP3 would require a more robust SNR than EP2, a greater amount of symbols dedicated to EP3 will use the more robust QPSK modulation in comparison with those dedicated to EP2.

In further exemplary operation, an equivalent SNR (SNR$_{eq}$) may be estimated according to the following equation (assuming that an end-point receives a portion of symbols using constellation A and a portion of symbols using constellation B):

SNR$_{eq}$=10*LOG$_{10}$(xA*10^(SNR$_A$/10)+yB*10^(SNR$_B$/10)) (Eq. 20)

Therefore, using the values from FIG. 14, if constellation A uses QPSK, then SNR$_A$=15 dB, and if constellation B uses 16 QAM, then SNR$_B$=22 dB. Accordingly, the composition of constellations may be targeted to end-points based on the respective location and loss, as well as a measured SNR values of (i) $SNR_{EP1}=22$ dB, (ii) $SNR_{EP2}=20$ dB, (iii) $SNR_{EP3}=17$ dB, and (iv) $SNR_{EP4}=15$ dB.

Accordingly, using Eq. 20, the following calculations may be further obtained: (1) for EP1, all of the dedicated symbols would use the 16 QAM modulation to match the 22 dB SNR; (2) for EP2, 40% of the dedicated symbols would be QPSK, and 60% of the dedicated symbols would be 16 QAM to match the 20 dB SNR; (3) for EP3, 85% of the dedicated symbols would be QPSK, and 15% of the dedicated symbols would be 16 QAM to match the 17 dB SNR; and (4) for EP4, all of the dedicated symbols would be QPSK to match the 15 dB SNR.

Figure 15:
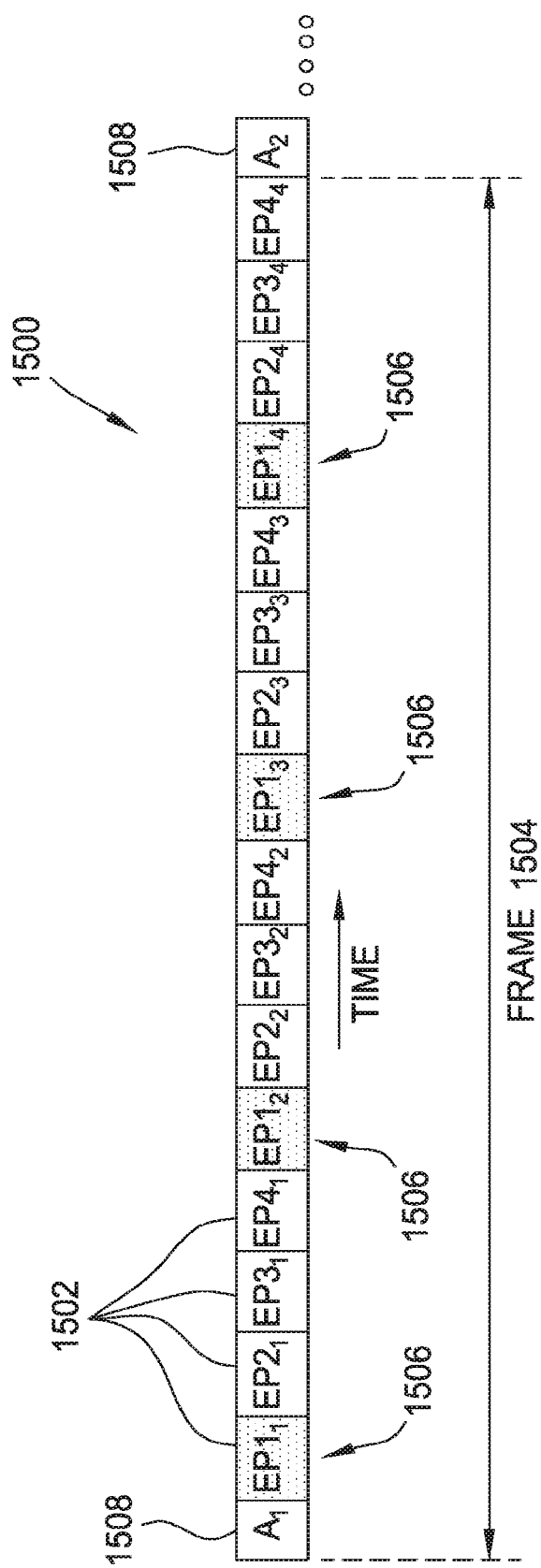
FIG. 15 illustrates an exemplary time sequence of symbol segments of a frame for different daisy-chain endpoints in accordance with an embodiment of the present disclosure.

FIG. 15 illustrates an exemplary time sequence 1500 of symbol segments 1502 of a frame 1504 for different daisy-chain endpoints. In the exemplary embodiment, time sequence 1500 represents an exemplary sequencing of the four-end-point (i.e., EP1-EP4) examples described immediately above. In time sequence 1500, a different FEC codeword 1506 may be used for different end-points, but the different codewords 1506 may be used across multiple segments 1502 of different frames 1506. In some embodiments, time sequence 1500 further includes administration/management information 1508, which may utilize a constellation capable of being received by all end-points.

That is, in some embodiments, time sequence 1500 implement FEC, and in such cases, an individual FEC codeword 1506 would not cross boundaries that separate transmissions from one end-point to another within a single frame 1504. For example, FEC codeword 1506 (i.e., targeted to EP1 in frame 1504) would be able to cross multiple segment boundaries, but only for segments 1502 that stay within the same end-point (e.g., codeword 1506 would be able to encompass an "EP11, EP12, EP13, EP14, etc." in a subsequent frame 1504'). A different codeword 1506 though, would be used for EP2 in the same frame 1504, but this different codeword 1506 would be able to similarly encompass an "EP21, EP22, EP23, EP24" in a subsequent frame 1504'. Accordingly, and FEC codeword targeted for different end-points may be different within a frame 1504, thereby advantageously providing greater granularity to differentiation in robustness and efficiency.

The systems and methods described herein are further advantageously capable of implementing remotely tunable optical couplers. For example, some of the embodiments described above provide a coarse level of approximation due to the fixed nature of the optical coupling ratios, whereas other of the embodiments are configured to closely adapt to the SNR required by an end-point. In an alternative embodiment, implementation of tunable optical couplers enable the hybrid capability of adjusting coupling ratios and matching SNR values of the several signals. In at least one embodiment, the coupling ratio of the tunable optical coupler is remotely adjustable from a central location, such as hub 202, FIG. 2.

Systems and methods described herein provide embodiments for targeting signal SNR values to end-points along a single fiber single wavelength optical daisy-chain, where the different end-points have different link loss budgets. Additional detail as described herein demonstrating further advantageous variations of the several embodiments, including multiple transmitter implementations, loss adjustment techniques using training sequences, and tunable couplers. These present embodiments are therefore particularly valuable with respect to systems employing PON architectures, and may also have some utility within cable fiber topology scenarios.

Exemplary embodiments of systems and methods for daisy-chaining sequential optical nodes are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An optical transmitter connected to an optical fiber strand of a communication network, the optical fiber strand including a plurality of nodes sequentially disposed at respective locations along the optical fiber strand at different distances, respectively, from the optical transmitter to a plurality of nodes, the transmitter comprising:
  a processor; and
  a memory device including computer-executable instructions, which, when executed by the processor, cause the optical transmitter to:
    generate a coherent optical signal over a single wavelength;
    calculate (i) a first attenuation loss from the optical transmitter to a first node of the plurality of nodes, and (ii) a second attenuation loss from the first node to a second node of the plurality of nodes; and
    transmit the coherent optical signal to each respective receiver of the one or more receivers at the single wavelength, wherein a first receiver of the one or more receivers is in operable communication with the first node and a second receiver is in operable communication at the second node, and wherein the first and second receivers are configured to receive the same coherent optical signal from the optical fiber strand at the same single wavelength based on the first attenuation loss and the second attenuation loss, respectively.

2. The optical transmitter of claim 1, wherein the plurality of nodes is sequentially disposed in a daisy-chain configuration along the optical fiber strand.

3. The optical transmitter of claim 1, disposed at an optical hub of the communication network.

4. The optical transmitter of claim 3, wherein the optical transmitter is a dual-polarization I/Q modulator configured for at least four independent data streams of the coherent optical signal.

5. The optical transmitter of claim 4, wherein the dual-polarization I/Q modulator is a dual-parallel Mach-Zehnder modulator (MZM).

6. The optical transmitter of claim 5, wherein the MZM is configured to include split asymmetric electrodes.

7. The optical transmitter of claim 6, wherein a first data stream is configured to feed into a longer electrode of the split asymmetric electrodes and a second data stream is configured to feed into a shorter electrode of the split asymmetric electrodes.

8. The optical transmitter of claim 7, wherein the first data stream requires a greater optical intensity swing than the second data stream.

9. The optical transmitter of claim 5, wherein the MZM further includes a driver configured to (i) receive a first data stream and a second data stream, and (ii) drive the first data stream at a voltage higher than a voltage driving the second data stream.

10. The optical transmitter of claim 9, wherein the driver includes a digital-to-analog converter.

11. The optical transmitter of claim 1, wherein the instructions further cause the optical transmitter to transmit the optical wavelength signal such that the first and second nodes receive substantially equal optical power.

12. The optical transmitter of claim 1, wherein the instructions further cause the optical transmitter to transmit the optical wavelength signal such that the first node receives the optical wavelength signal at a substantially different optical power level than the second node.

13. The optical transmitter of claim 12, wherein the instructions further cause the optical transmitter to transmit the optical wavelength signal in coordination with at least one of a fixed coupling ratio coupler and a tunable optical coupler disposed between the optical transmitter and the first and second nodes.

14. The optical transmitter of claim 1, wherein the coherent optical signal is configured for at least one of a QPSK, 16 QAM, 64 QAM, and 256 QAM modulation format.

15. The optical transmitter of claim 1, wherein the coherent optical signal includes a plurality of independent data streams on the single wavelength including a first data stream and a second data stream.

16. The optical transmitter of claim 15, wherein the first data stream actively carries transmitted data, and wherein the second data stream is silent.

17. The optical transmitter of claim 16, wherein the instructions further cause the optical transmitter to copy data bits of the active first data stream onto the silent second data stream to enhance the OSNR.

18. The optical transmitter of claim 15, wherein the first data stream carries a most significant bit (MSB) of a constellation having a plurality of symbols, and wherein the second data stream carries a least significant bit (LSB) of the constellation.

19. The optical transmitter of claim 18, wherein the first data stream carrying the MSB is used by a particular receiver of the plurality of receivers having the highest loss relative to other receivers.

20. The optical transmitter of claim 1, wherein the instructions cause the processor to determine an optical signal-to-noise ratio (OSNR) for each receiver of one or more receivers operably coupled with a respective node of the plurality of nodes.

* * * * *